June 14, 1966 O. L. RICE 3,255,916

STATIC SEAL

Filed Jan. 27, 1964

INVENTOR
ORVAL L. RICE

BY Dodge and Sons
ATTORNEYS

United States Patent Office 3,255,916
Patented June 14, 1966

3,255,916
STATIC SEAL

Orval L. Rice, Kalamazoo, Mich., assignor to The New York Air Brake Company, a corporation of New Jersey Filed Jan. 27, 1964, Ser. No. 340,226
3 Claims. (Cl. 220—39)

This invention relates to static seals, and particularly to an improved threaded cap or plug seal used to close openings in components containing fluid under pressure.

In the hydraulic art many components, especially valves, contain threaded openings, other than flow passages or ports, which are required during manufacture or servicing but which must be closed and sealed during use. In the past, these openings usually have been sealed by an elastic O-ring which is seated in an annular groove formed in a cap or plug that is screwed into the opening and which is squeezed against the outer peripheral wall of a counterbore at the end of the threaded opening. The diameter of the counterbore normally is .009 to .012 inch greater than the major diameter of the threads, but since the new taps used to form the threads are made .009 to .012 inch oversize, this outer peripheral wall frequently is scored during the threading operation. This causes the seal to leak and results in a considerable number of unacceptable components.

The object of this invention is to provide an improved threaded plug or cap seal which eliminates the leakage problem just mentioned and which, at least in its preferred form, is less expensive to construct than the prior seals of which I am aware. According to this invention, the counterbore of the prior seal is replaced by an outward flaring conical surface whose minimum diameter is greater than the major diameter of the threads, and the elastic sealing ring is confined between this surface and a second substantially parallel conical surface formed on the plug or cap. The provision of the first conical surface eliminates the scoring problem accompanying use of new taps, and the provision of the second conical surface facilitates lead in of the sealing ring by minimizing rolling of the ring. The preferred embodiment of the invention uses a sealing ring having a square cross section and, therefore, since these sealing rings are considerably cheaper than the O-ring of round cross section used previously, this embodiment affords substantial savings in manufacturing costs. Furthermore, in the preferred design the threaded opening is a standard S.A.E. (Society of Automotive Engineers) port. This permits the opening to be formed using a standard port-forming tool and thus makes unnecessary the stocking of special tools.

The preferred embodiment of the invention is described herein with reference to the accompanying drawing in which.

Figure 1:
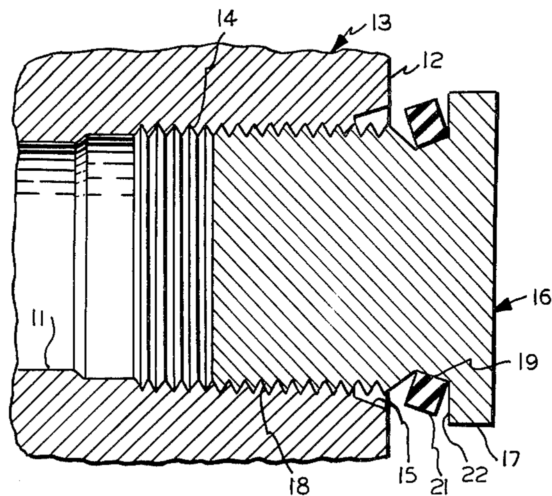
FIG. 1 is a cross-sectional view of a typical threaded cap installation employing the invention, the cap being shown as it first engages the threads in the opening.

As shown in the drawing, the invention is embodied in a threaded cap closure for an opening defined by a bore 11 that opens through the outer face 12 of a body 13. The bore 11 is provided with a threaded portion 14 which is spaced inward from the face 12 by an outward flaring conical surface 15. The minimum diameter of surface 15 is greater than the major diameter of the threads in portion 14 so these threads may be formed without risk of scoring surface 15 even when using an oversize tap. The opening is dimensioned to correspond to a standard S.A.E. port so face 12 may be spot-faced and bore 11 may be drilled and chamfered to form conical surface 15 by a standard S.A.E. port-forming tool.

The cap 16 for closing the opening in body 13 is formed with a hexagonal head 17 and a threaded portion 18, which is adapted to mate with the threaded portion 14 of bore 11, and these elements are spaced from each other by a conical surface 19. When the cap is screwed into place in bore 11, conical surface 19 is substantially parallel with but spaced from conical surface 15 to provide an intervening annular space for the reception of an elastic sealing ring 21 of square cross section. The maximum diameter of surface 19 is less than the minor diameter of the threads of portion 18 in order to provide runout space for the thread-forming tool and thus prevent marring of surface 19.

Figure 2:
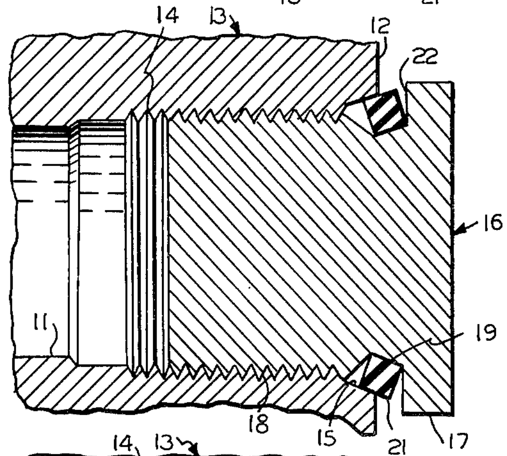
FIG. 2 is a view similar to FIG. 1, but here the cap has been advanced to a position in which the sealing ring engages the conical surface of the opening.
Figure 3:
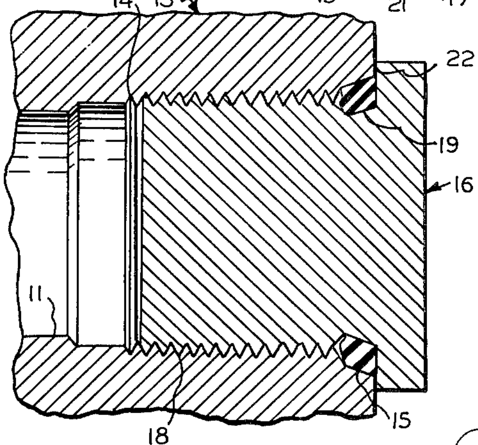
FIG. 3 is a view similar to the other two, but showing the cap screwed tightly into the opening.

Since the sealing ring 21 is seated on conical surface 19, its outer peripheral surface is substantially parallel with conical surface 15 as the two surfaces are brought into engagement (see FIG. 2). This arrangement reduces the tendency of the ring to roll back upon itself as cap 16 is tightened and thereby prevents mutilation of the duces the tendency of the ring to roll back upon itself as ring. The spacing between surfaces 15 and 19 when the cap 16 is in place is slightly less than the radial width of ring 21 and, therefore, the ring is compressed as cap 16 is tightened. As a result, all voids between the mating surfaces of ring 21 and the conical surfaces 15 and 19 are closed and an effective fluid seal is produced. When the cap is fully tightened, the annular shoulder 22 on cap 16 abuts face 12 of body 13 and thus prevents extrusion of ring 21 through the space between these members.

As stated previously, the drawing and description relate only to the preferred embodiment of the invention. Since changes can be made in the structure of this embodiment without departing from the inventive concept, the following claims should provide the sole measure of the scope of the invention.

What I claim is:

1. In combination (a) a body having an outer face and a bore extending inward from that face and formed with a threaded portion spaced inward from the face;

(b) a first outward flaring conical surface on the bore at the end adjacent said outer face, the minimum diameter of the first conical surface being greater than the major diameter of the threads of the threaded portion;

(c) a member received within the bore and formed with external threads which mate with the threads of the threaded portion of the bore;

(d) a second conical surface formed on said member, the second conical surface being spaced from but substantially parallel with the first conical surface, the maximum diameter of the second conical surface being less than the minor diameter of the threads on the member;

(e) an annular shoulder formed on said member adjacent the maximum diameter end of the second conical surface and having a portion adapted to abut said outer face of the body; and (f) an elastic sealing ring confined between the member and the body and compressed against the two conical surfaces and the annular shoulder.

2. The combination defined in claim 1 in which the elastic sealing ring has a square cross section.

3. The combination defined in claim 1 in which the threaded bore is a standard S.A.E. port.

References Cited by the Examiner

UNITED STATES PATENTS

| | | | |
|---|---|---|---|
| 3,070,254 | 12/1962 | Carse et al. | 220—39 |
| 3,086,679 | 4/1963 | Bijvoet | 220—39 |
| 3,184,091 | 5/1965 | Hoffman | 217—99 |

THERON E. CONDON, *Primary Examiner.*

G. T. HALL, *Assistant Examiner.*